March 13, 1951 A. L. PEARSON 2,545,241
TREE MOVING APPARATUS
Filed April 26, 1949 3 Sheets-Sheet 2
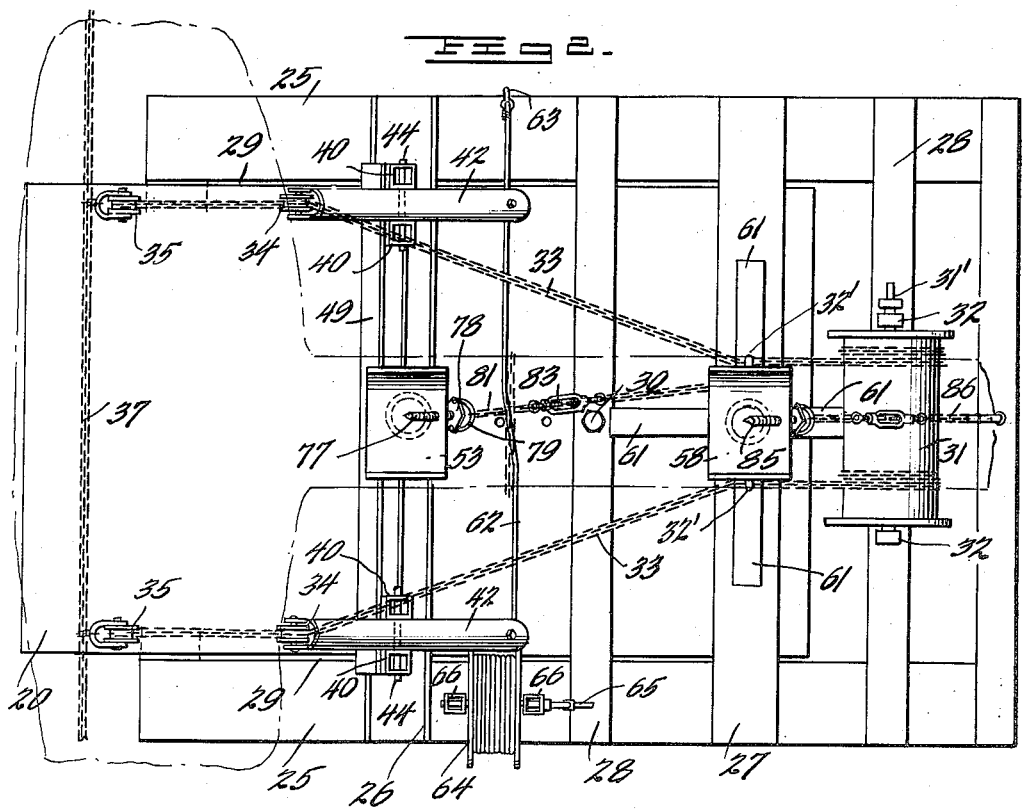
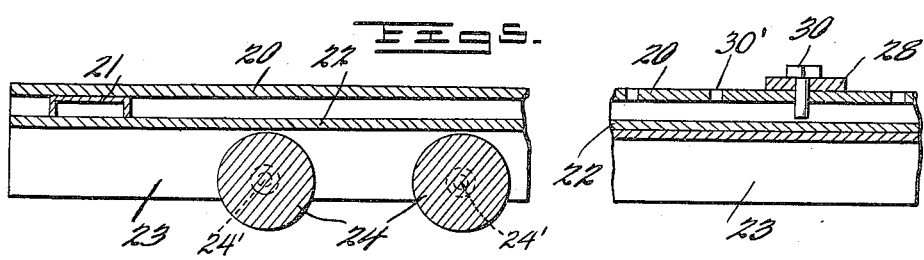
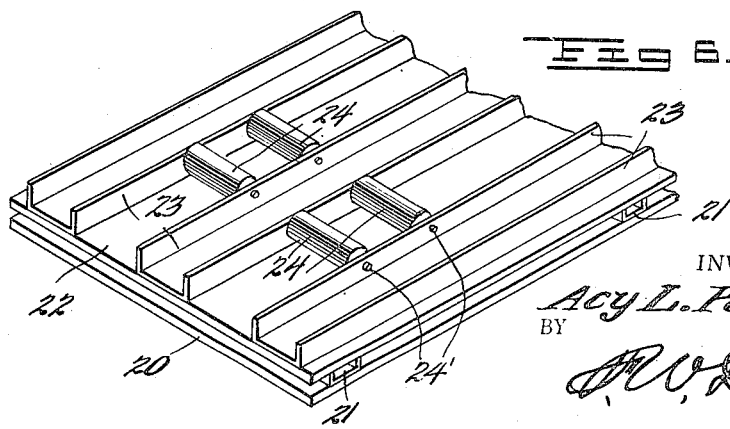
INVENTOR.
Acy L. Pearson
BY
ATTORNEY.

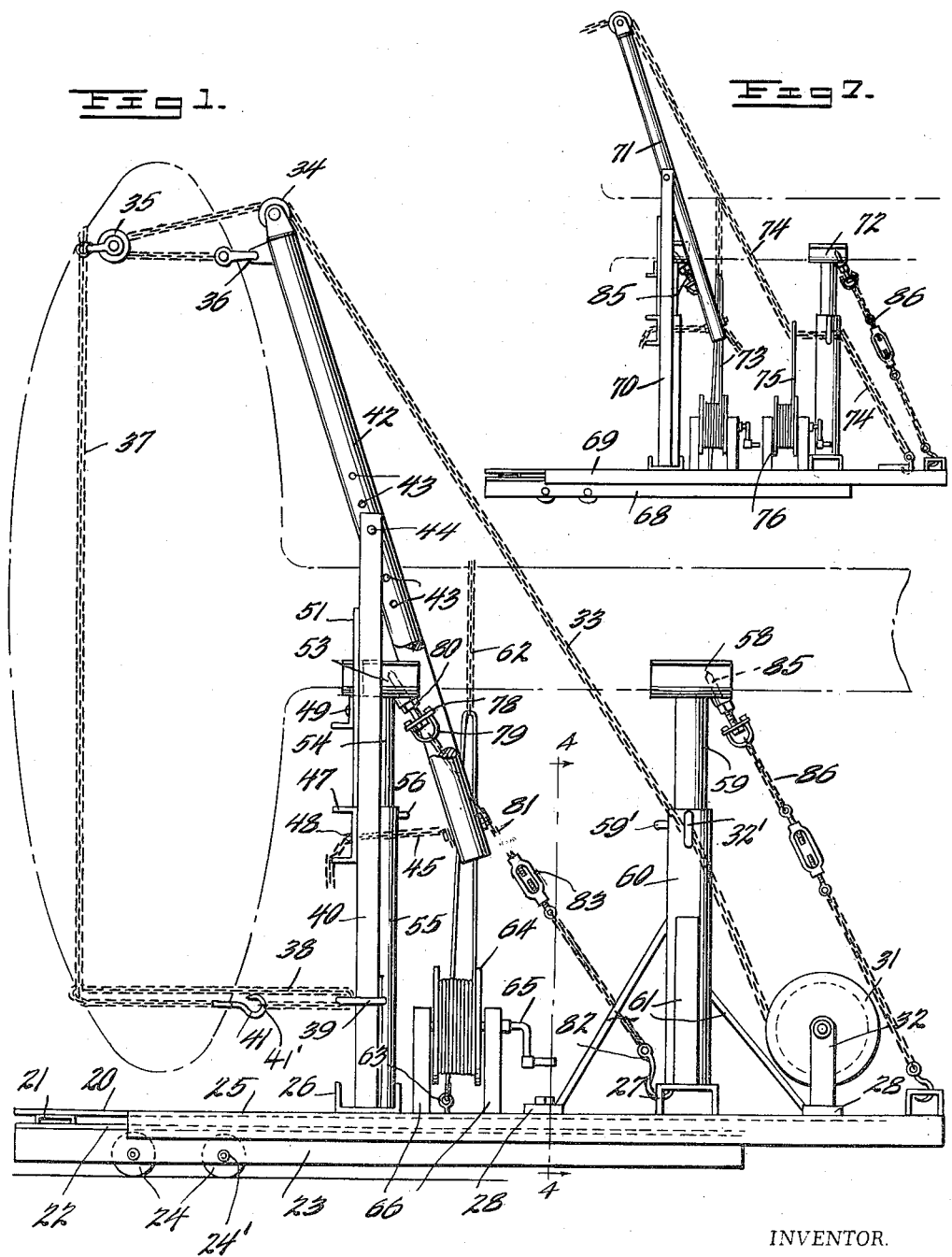

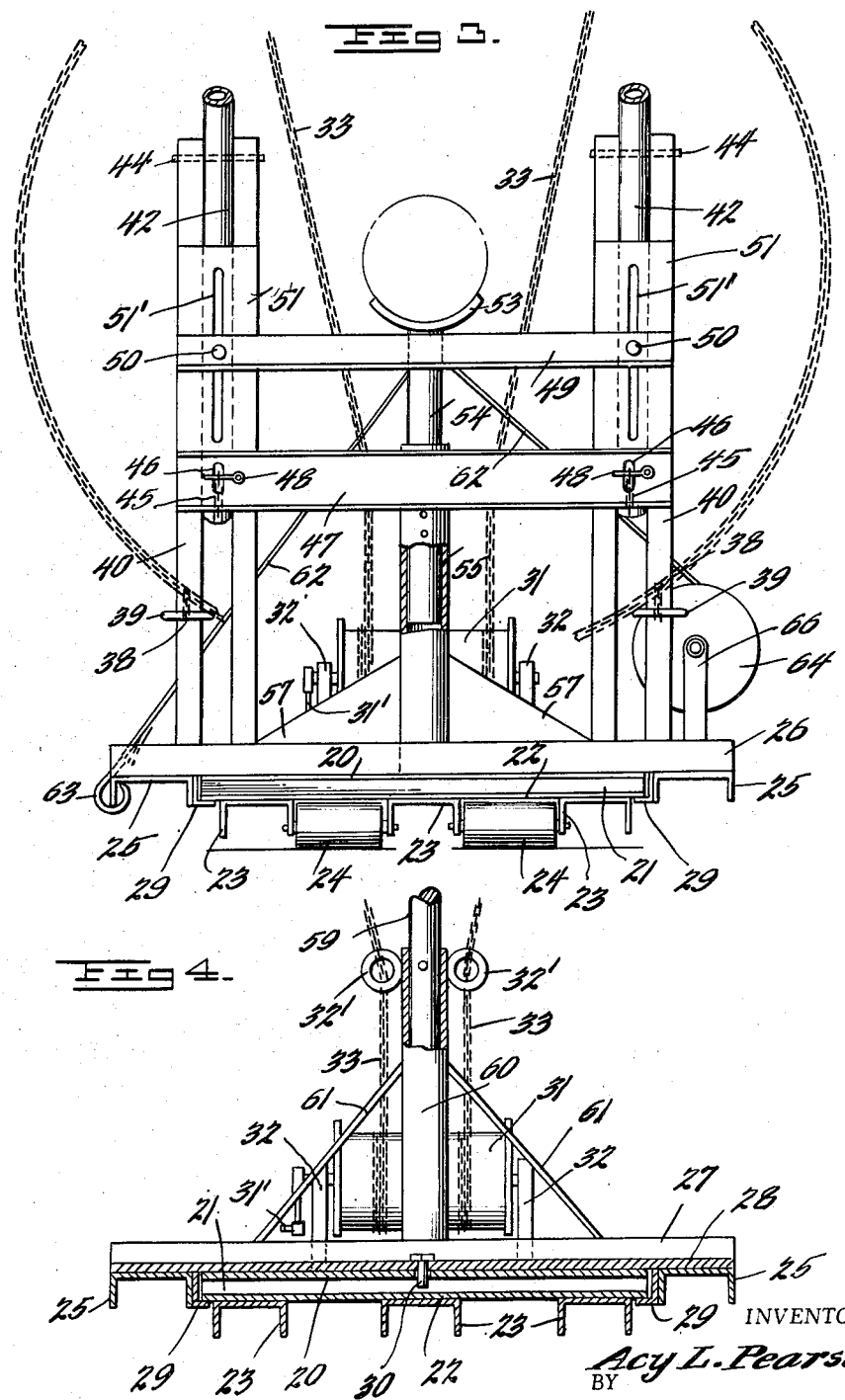

Patented Mar. 13, 1951

2,545,241

UNITED STATES PATENT OFFICE 2,545,241

TREE MOVING APPARATUS

Acy L. Pearson, Memphis, Tenn.

Application April 26, 1949, Serial No. 89,685

13 Claims. (Cl. 214—3)

My invention relates to tree-moving apparatus, and particularly to such apparatus as is used for uprooting trees and replanting them in another place. It is an object of the invention to provide an apparatus that shall be simple in construction and easy to handle, while yet capable of holding a tree firmly in place during transportation.

Another object is to provide means readily adaptable for handling trees of different sizes.

Another object is to provide improved means for holding the root ball in place during transportation.

Another object is to provide a platform that is adjustable in length, as for increasing the leverage for tilting or uprooting a tree, and for then shortening it for convenience of transportation, and to balance the weight of the tree.

Referring to the annexed drawings, which are made a part of this application and in which similar reference characters indicate similar parts:

Fig. 1 is a side elevation of the device of my invention,

Fig. 2, a top plan of the same,

Fig. 3, an elevation viewed from the left of Fig. 1, with parts omitted,

Fig. 4, a section on line 4—4 of Fig. 1,

Fig. 5, a longitudinal section of the cooperating lower and main frames,

Fig. 6, a bottom plan of the lower frame, and

Fig. 7, a side elevation of a modification.

In the drawings, reference character 20 indicates a metal plate forming a platform of a lower frame, underneath which there are channel bars 21, another plate 22, and another set of channel bars 23 arranged at right angles to the bars 21, the bars of each set being preferably parallel to each other, and all the members of the lower set being rigidly secured together as by welding. Rollers 24 are journaled in the flanges of the channel bars, the arrangement here shown including three lower channel bars, with the rollers located between the middle bar and the respective outer bars, and having reduced extensions 24' journaled in apertures in said flanges. These rollers may be adjustable on the frame, as by providing additional holes to receive the journals 24'. Obviously the frame may be provided with slidable runners or the like instead of rollers.

A main frame is mounted on the lower frame, the main frame comprising side channel bars 25, 25 connected by a transversely extending upwardly facing channel bar 26, a downwardly facing channel bar 27, and flat bars 28. The main frame rests upon the lower frame and is held down thereon by means of angle irons 29 here shown as secured to the inner flanges of the channel bars 25, 25 and having inwardly directed flanges engaging under the side edges of the plate 20. The main frame is slidable along the lower frame, and a pin 30 (Figs. 5 and 6) is provided for maintaining the relative position of frames, said pin fitting in a hole in one of the cross bars 28 and in any one of several spaced holes in the plate 20. The pin may be engaged in the hole in plate 20 that is farthest to the right in Fig. 2 (or nearer the rear of the vehicle), thus lengthening the apparatus to suit a taller tree, as hereinafter explained, or the main frame may be moved to the left to enable the pin to engage in the hole that is farthest to the left, in order to shorten the apparatus and make it easier to handle, as in transporting a tree through the woods. In the position first mentioned the mechanical advantage had by the use of the apparatus in pulling a tree over to uproot it and to bring it into position for transportation is also increased by lengthening the lever constituted by the apparatus when so used.

The main frame carries various parts that assist in the operations for which the apparatus is designed. Thus, a winch is mounted on the crossbar 28 that is nearer the rear end of the apparatus, said winch comprising a drum 31 mounted for rotation in bearings in uprights 32 on said crossbar, said drum being driven by any suitable or preferred means for winding up chains 33, 33, e. g., by a crank 31', that pass respectively through guide eyes 32', then over pulleys 34 and 35 to a point of attachment for their ends at 36. The root ball is shown as sustained by a chain 37 encircling it near the bottom, the pulleys 35, 35 being attached to the ball sustaining chain 37 near that part of the ball that is highest when in the position of Fig. 1 and at opposite sides thereof, and the lower part of the ball being supported by a pair of chains or cables 38 connecting the opposite lower corner parts of the ball to rings 39 on fixed posts 40. It will be obvious that cables or ropes may be used in place of chains, and the term "cables" is used in the claims as being generic to all such devices. It may be noted that the chains 38 are each provided at one end with an eye or ring 41', and at the other end with a hook 41 engageable with the same to hold the tree ball in place.

Each post 40 has mounted thereon at its upper end a lever 42, here shown as a length of pipe, having a plurality of longitudinally spaced holes 43 to receive a pivot bolt 44. The lever may be used as a quick tightening means for the chain, and its action may be varied by adjustment of its pivot in holes 43. Each lever may be operated as a quick slack take-up for its chain, by means of a chain section 45 attached to the lower end of the lever and extending through a slot 46 in a channel bar 47 mounted on posts 40. A pin 48 is pivotally connected to bar 47 adjacent each slot 46 and this pin may be inserted into a link of the chain at the rear side of bar 47 to hold the corresponding lever 42 in adjusted position. Each post 40 comprises a duplicate pair of uprights connected by a pivot pin 44 and by a fixed plate 51 having a slot 51' to receive a bolt 50 on a crossbar 49. The crossbar is welded to a stem 54 fixed to or integral with a saddle 53 for supporting a portion of a prone tree adjacent the tree ball. This stem rests in a socket 55 and is adjustable vertically therein, it being held in adjusted position by a pin 56 that may rest on top of the socket member or may pass through registering holes in the two telescoping members. The angle iron 49 moves up and down with the saddle, and is fixed to the posts 40 by means of the bolts 50 passing through the angle iron and the plates 51, thus bracing the frame and helping to support the saddle. The saddle is held against forward or rearward tilting movement by bars 47 and 49, and against lateral movement by braces 57, 57.

Another saddle is shown at 58 on a stem 59 mounted for vertical adjustment in a socket 60 by means of a pin 59', as in the case of the saddle 53, said saddle supporting means being braced on all sides by braces 61, 61.

At a convenient point, as between the saddles 53 and 58, means is provided for tying down a tree on the apparatus, said means consisting of a chain secured at one end to a side bar 25 at 63 and at the other end to the drum 64 of a winch having a crank 65, the drum being journaled in bearings on uprights 66, 66 on the bar 25 at the opposite side of the apparatus.

The apparatus so far described is operative and satisfactory in most situations, but sometimes a tree will slip off one or both of the saddles above described, e. g., in the springtime when the bark is loose and slippery. For such conditions my apparatus may include means for affixing the tree trunk directly to the saddles, said means comprising at the front saddle a screw 77. The saddle is drilled and tapped to hold the screw at any desired depth in the tree trunk, and the screw may be mounted at any preferred angle or position with reference to the saddle. It is preferably sharp-pointed as shown and is attached by a swivel connection to a chain 81, having a turnbuckle for adjustment of length as for tightening the chain. A locknut 80 holds the screw in adjusted position, and a hook 82 is provided at the free end of the chain for engagement with frame bar 27 or other fixed part. The swivel connection may consist of a plate 78 through which the screw passes and a link 79 engaging an adjacent link of the chain 81. In like manner a screw 85 may be attached to the tree trunk at saddle 58, with a chain 86 for holding it.

In the operation of the device for moving a relatively large tree, the main frame is first moved to the right as far as possible on the lower frame and the pin 30 is inserted in the last hole in plate 29 (Fig. 5). The apparatus is upended against the tree in known manner and the chains 37, 33 and 62 are positioned, the lever 42 is adjusted and the winches 31 and 64 are operated to tighten the cables. If desired other means may be employed to fix the tree still more securely to the apparatus, e. g., screws 77 and 85, and the apparatus is pulled down to the position of Fig. 1. Now the main frame may be moved back to the left until pin 30 can be inserted in the hole farthest to the left in plate 20, thus shortening the apparatus for easy turning during transportation through woods and around obstacles of various kinds. In making this last-mentioned adjustment the balancing of the apparatus and the tree carried thereby will also be had in mind.

In the modified form shown in Fig. 7, the lower frame 68, the main frame 69, posts 70, lever 71, saddle 72, fastening means 73 and auxiliary parts may all be as in the form first described, but the chains 74 are attached to the main frame at their free ends and a cable is provided at 75 for each chain 74, with a winch for tightening it after the slack has been taken up preliminarily by lever 71.

It will be obvious to those skilled in the art that many changes may be made in the devices herein disclosed, all without departing from the spirit of the invention; and therefore I do not limit myself to what is shown in the drawings and described in the specification, but only as indicated in the appended claims.

Having thus fully described my invention, what I claim is:

1. Tree moving apparatus comprising a vehicle, a saddle thereon, posts at opposite sides of the saddle, levers pivoted on said posts for movement in parallel planes extending lengthwise of the vehicle, a winch at the rear of the vehicle, tree ball sustaining means, cables each extending from said sustaining means over one end of a lever and thence to said winch, and means for holding a lever in any of a plurality of the positions to which it may be swung.

2. A device as in claim 1, including means for varying the relative length of the lever arms.

3. Tree transporting apparatus comprising a lower wheeled frame having guides at opposite sides, a main frame movable endwise of the apparatus with reference to the lower frame, said main frame overlapping the lower frame at opposite sides and having depending means coacting with said guides, means for holding said frames in various relative longitudinal positions, spaced tree supporting sadles on the main frame, and means between said saddles for holding a tree in place thereon.

4. A device as in claim 3, wherein said last-named holding means comprises a winch on the main frame and a cable secured at one end to one side of the main frame and at the other end to said winch.

5. Tree transporting apparatus comprising a frame, longitudinally spaced saddles thereon, laterally spaced posts near the front end of the frame, a winch at the rear of the frame, sustaining means adapted to be located at the underside of a tree ball, connecting means extending from the sustaining means to the lower ends of said posts, cables extending from said winch above said posts for attachment to said sustaining means at the upper edge of said ball, and quickly-acting means for taking up slack in said cables.

6. Tree moving means comprising a vehicle having a frame, a saddle on the frame for supporting a tree trunk, posts at opposite sides of the saddle, means for connecting the lower edge of the tree ball lying on said saddle to said posts, ball sustaining means, and means for connecting the upper edge of said ball sustaining means to the rear end of the frame.

7. A device as in claim 6, wherein said last-named means comprises a pair of levers pivoted to upper parts of the posts, a pair of cables adapted to be connected to the upper edge of said tree ball, means for adjustably attaching one end of each lever to a lower fixed portion of said vehicle, and a guide for each cable on the free end of one of said levers.

8. A device as in claim 7, wherein the normal position of the levers is substantially vertical, a frame member having slots adjacent the lower ends of the respective levers, a chain on each lever adjacent each of said slots, and pins on the apparatus adjacent said slots in position for engagement in a link of the chain projecting through said slot.

9. Tree moving means comprising a vehicle having a frame, a saddle thereon for a tree trunk, means for holding the ball of a prone tree whose trunk is on said saddle, said means including a cable attached to the upper part of said ball, means for attachment of the free end of the cable to the frame of the vehicle, means for taking up slack in said cable including a lever having an arm engaging said cable, and a pivot for the lever, means whereby said lever can be adjusted with relation to the pivot for varying the relative length of its lever arms.

10. A device as in claim 9, including a pair of posts at opposite sides of said saddle, a slack take-up lever pivoted to each of said posts for movement in a vertical plane, the upper ends of the levers engaging respectively with chains connected to the upper part of the tree ball in spaced relation, and means to attach the lower end of each lever to the adjacent post for holding its chain taut.

11. Tree moving means comprising a vehicle having a frame, tree trunk supporting means thereon, posts at opposite sides of said means, means connecting to the frame the upper edge of a tree ball of a tree in prone position on the vehicle, said means including a winding means, cables extending from said winding means to laterally spaced points on said edge, and quickly-acting slack take-up means acting on said cables between the ball and the winding means.

12. A device as in claim 11, including take-up levers pivoted on said posts, and pulleys on said levers for engagement with said cables.

13. A device as in claim 12, including levers having arms extending upward from said posts, pulleys on said arms, ball sustaining means, pulleys attached to said sustaining means for guiding said cables, and means near the upper ends of said levers for attachment of the extreme ends of said cables.

ACY L. PEARSON.

REFERENCES CITED

The following references are of record in the file of this patent:

UNITED STATES PATENTS

| Number | Name | Date |
|---|---|---|
| 1,046,720 | Barnes | Dec. 10, 1912 |
| 1,084,966 | Rodes | Jan. 20, 1914 |
| 1,202,912 | Souther | Oct. 31, 1916 |
| 1,485,971 | Evans | Mar. 4, 1924 |
| 2,264,571 | Jeffrey | Dec. 1, 1941 |
| 2,319,536 | Deibel | May 18, 1943 |
| 2,336,122 | Pearson | Dec. 7, 1943 |